United States Patent [19]

Nakayama et al.

[11] Patent Number: 5,796,878
[45] Date of Patent: Aug. 18, 1998

[54] IMAGE INTERPOLATING CIRCUIT

[75] Inventors: Tadayoshi Nakayama; Norihiro Kawahara, both of Tokyo, Japan

[73] Assignee: Canon Kabushiki Kaisha, Tokyo, Japan

[21] Appl. No.: 357,207

[22] Filed: Dec. 13, 1994

Related U.S. Application Data

[63] Continuation of Ser. No. 77,963, Jun. 18, 1993, abandoned, which is a continuation of Ser. No. 942,089, Sep. 8, 1992, abandoned, which is a continuation of Ser. No. 622,537, Dec. 5, 1990, abandoned.

[30] Foreign Application Priority Data

Dec. 8, 1989 [JP] Japan .................. 1-319929

[51] Int. Cl.$^6$ .................. H04N 9/42
[52] U.S. Cl. .................. 382/300; 382/298
[58] Field of Search .................. 382/254, 269, 382/266, 300, 299, 298; 358/525

[56] References Cited

U.S. PATENT DOCUMENTS

| | | | |
|---|---|---|---|
| 4,298,867 | 11/1981 | Craig | 340/728 |
| 4,360,883 | 11/1982 | Ejiri et al. | 364/515 |
| 4,771,471 | 9/1988 | Kitamura | 382/41 |
| 4,837,562 | 6/1989 | Nishiura et al. | 340/728 |
| 4,891,702 | 1/1990 | Nakayama et al. | 358/140 |
| 4,987,489 | 1/1991 | Hurley et al. | 358/140 |
| 5,014,129 | 5/1991 | Imanishi | 358/166 |
| 5,019,903 | 5/1991 | Dougall et al. | 358/140 |
| 5,166,794 | 11/1992 | Tanaka | 358/167 |

Primary Examiner—Yon J. Couso
Attorney, Agent, or Firm—Fitzpatrick, Cella, Harper & Scinto

[57]   ABSTRACT

An image interpolating circuit for producing pixel information of an interpolation line located between first and second scanning lines by using pixel information of the first and second scanning lines. A detecting circuit is provided for detecting an oblique edge pattern by using the pixel information of the first and second scanning lines, and an interpolation signal producing circuit is provided for setting the number of pixels of the interpolation scanning line to be larger than the number of pixels of the first and second scanning lines and for producing the pixel information for the interpolation line in accordance with a detection output of the detecting circuit.

27 Claims, 11 Drawing Sheets

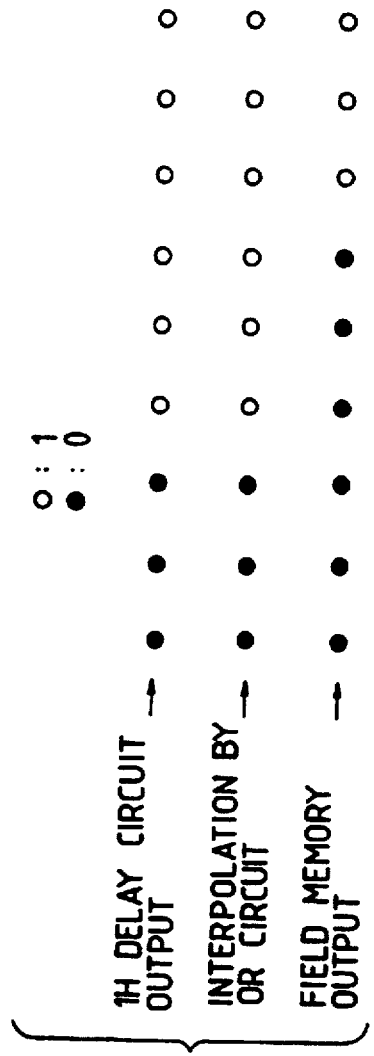
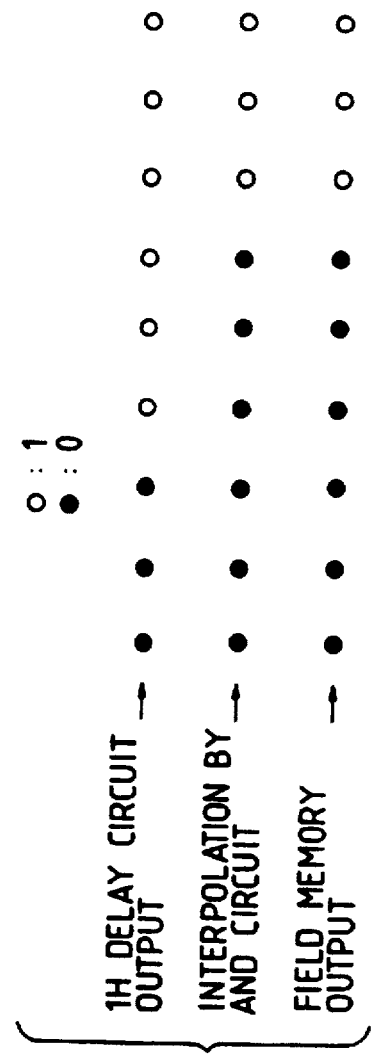

IMAGE INTERPOLATING CIRCUIT

This application is a continuation of application Ser. No. 08/077,963 filed Jun. 18, 1993, which is a continuation of Ser. No. 07/942,089, filed Sep. 8, 1992, which is a continuation of Ser. No. 07/622,537, filed Dec. 5, 1990, all now abandoned.

BACKGROUND OF THE INVENTION

1. Field of the Invention

The present invention relates to an image interpolating circuit for interpolating and producing image information of one field of a binary image which is interlace scanned from image information of the other field of the binary image.

2. Related Background Art

In a video system of the interlace scanning type, one image is constructed by image information of two fields.

In such a video system, for instance, in the case where there is an image having only the information of one field such as image information stored in a field memory, hitherto, the image has been displayed while interpolating the image information of one field by a construction as shown in FIG. 11 or 12. The conventional examples will now be described hereinbelow with reference to FIGS. 11 and 12.

FIG. 11 shows the conventional example of the simplest construction.

A read-out address generator 703 is reset by a reset signal which is input at a field period from a terminal 701. An address indicative of the head address in a field memory 704 is sent from the address generator 703 to the field memory 704. The field memory 704 reads out the information of one pixel from such an address and outputs the information to a terminal 705. After that, a clock is input from a terminal 702 every pixel, the address generator 703 is incremented, and the pixels are sequentially read out of the field memory 704 and output to the terminal 705. A digital signal which was output from the terminal 705 is, for instance, converted into the analog signal by a D/A converter. Since the period of the reset signal which is input from the terminal 701 is equal to the field period [accurately speaking, since it must be an integer times as long as the horizontal scanning period (H), the period slightly differs every field and in the case where one frame (=two fields) is set to 525H, an interval of the reset signals is alternately repeatedly set to 262H and 263H], the same image information is read out every field and displayed. In the case where such image information is seen as an image of one frame, the same information is displayed by using two adjacent lines as one unit, so that there is a problem such that the edge in the oblique direction is seen as a zigzag pattern.

On the other hand, in the case where the image information is multi-value information, a construction shown in FIG. 12 has been considered as a method of making such a zigzag pattern as inconspicuous as possible.

In FIG. 12, reference numerals 701 to 705 denote the parts and elements having the same functions as those shown in FIG. 11. Reference numeral 802 denotes a 1H delay circuit for delaying the digital signal which was output from the field memory 704 by only one horizontal scanning period; 803 is a mean value circuit for calculating a mean value between an output of the 1H delay circuit and the output of the field memory and outputting the mean value; and 804 is a selector for selecting either one of an output of the mean value circuit and the output of the field memory on the basis of a field index signal which is input from a terminal 801 and outputting the selected value.

The field index signal is set to "1" for the field in which the interval between the reset signals which are input from the terminal 701 is equal to 262H. The field index signal is set to "0" for the field in which the interval between the reset signals is equal to 263H. When the field index signal is set to "1", the output of the field memory is output to the terminal 705. When the field index signal is set to "0", the mean value of the output of the field memory and the output of the 1H delay circuit is output to the terminal 705.

In the case of considering such an output signal as an image of one frame, the information stored in the field memory is displayed every other line and the average information of the information of the upper and lower lines is displayed in the line between the upper and lower lines. Therefore, the zigzag edge pattern in the oblique direction which caused the problem in the construction of FIG. 11 is slightly improved.

In the case where, from an image signal having only the information of one field, an image signal of another field of the interlace scan is interpolated and produced and image information of one frame is obtained, the zigzag edge pattern in the oblique direction in a multi-value image could be improved by using the construction shown in FIG. 12. However, in the case of a binary image, such an improving effect is not derived.

This is because one pixel of a binary image has only the information of one bit, the mean value circuit 803 in FIG. 12 functions as a 2-input AND circuit in the case of omitting the figures below the decimal point and functions as a 2-input OR circuit in the case of raising the figures below the decimal point to a unit and a proper mean value cannot be obtained. A change point (which is a part of the oblique edge) of the data of the interpolation signal in the oblique edge portion eventually coincides with a change point of the data of either one of the upper and lower lines as shown in FIG. 13 or 14. The zigzag pattern of the oblique edge still remains. FIG. 13 shows an interpolation example using an OR circuit. FIG. 14 shows an interpolation example using an AND circuit.

SUMMARY OF THE INVENTION

The present invention is made in consideration of the above circumstances and it is an object of the invention to provide a binary image interpolating circuit which can produce an interpolation signal in which an edge portion was improved in the case where, from image information of one field, image information of one remaining field of an interlace scan is interpolated and produced.

To accomplish the above object, according to an embodiment of the invention, there is provided an image interpolating circuit for producing pixel information of an interpolation scanning line locating between first and second scanning lines by using the pixel information of the first and second scanning lines, wherein the circuit comprises: means for detecting an oblique edge pattern by using the pixel information of the first and second scanning lines; and interpolation signal producing means for setting the number of pixels of the interpolation scanning line to be larger than the number of pixels of the first and second scanning lines and for producing the pixel information of the interpolation scanning line in accordance with a detection output of the detecting means.

According to an embodiment with the above construction, by using the means for detecting an oblique edge with reference to a plurality of lines and the means for producing an interpolation signal which was oversampled in accordance with a detection output of the detecting means, from the image signal having only the information of one field, the image of another field of the interlace scan is interpolated and produced, so that the frame image in which the oblique edge was improved can be obtained.

The above and other objects and features of the present invention will become apparent from the following detailed description and the appended claims with reference to the accompanying drawings.

BRIEF DESCRIPTION OF THE DRAWINGS

FIGS. 13 and 14 are diagrams schematically showing the results of processes which are obtained by using conventional methods in the case of producing a frame binary image from a field binary image.

DETAILED DESCRIPTION OF THE PREFERRED EMBODIMENTS

Preferred embodiments according to the invention will be described in detail hereinbelow with reference to FIGS. 1 to 10.

The fundamental principle of the invention will be first described.

It is assumed that the number of lines which are referred to is set to two. Those two lines correspond to upper and lower lines of a line to be interpolated of a frame binary image and correspond to signals which have already existed in a field memory or the like.

It is now assumed that edges in the oblique direction were detected in two lines which are being referred to. Those edges can be expressed as follows.

$a\ b_1\ b_2\ \ldots\ b_n\ \bar{a}$ ←upper line (first scanning line)

$a\ \bar{b}_1\ \bar{b}_2\ \ldots\ \bar{b}_n\ \bar{a}$ ←lower line (second scanning line)

where, $a=1$ or $0$, $b_1=b_2=\ldots=b_n=1$ or $0$.

Figure 2:
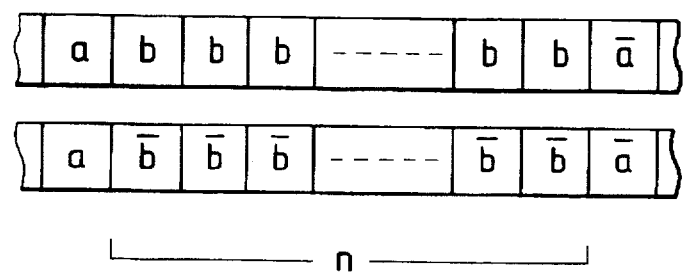
FIG. 2 is a diagrammatical view showing an edge portion.

Assuming that n is called an edge width, the number of kinds of oblique edges having the same edge width (n) is four as shown in FIG. 2. All of the four kinds can be expressed in the above manner.

Figure 3:
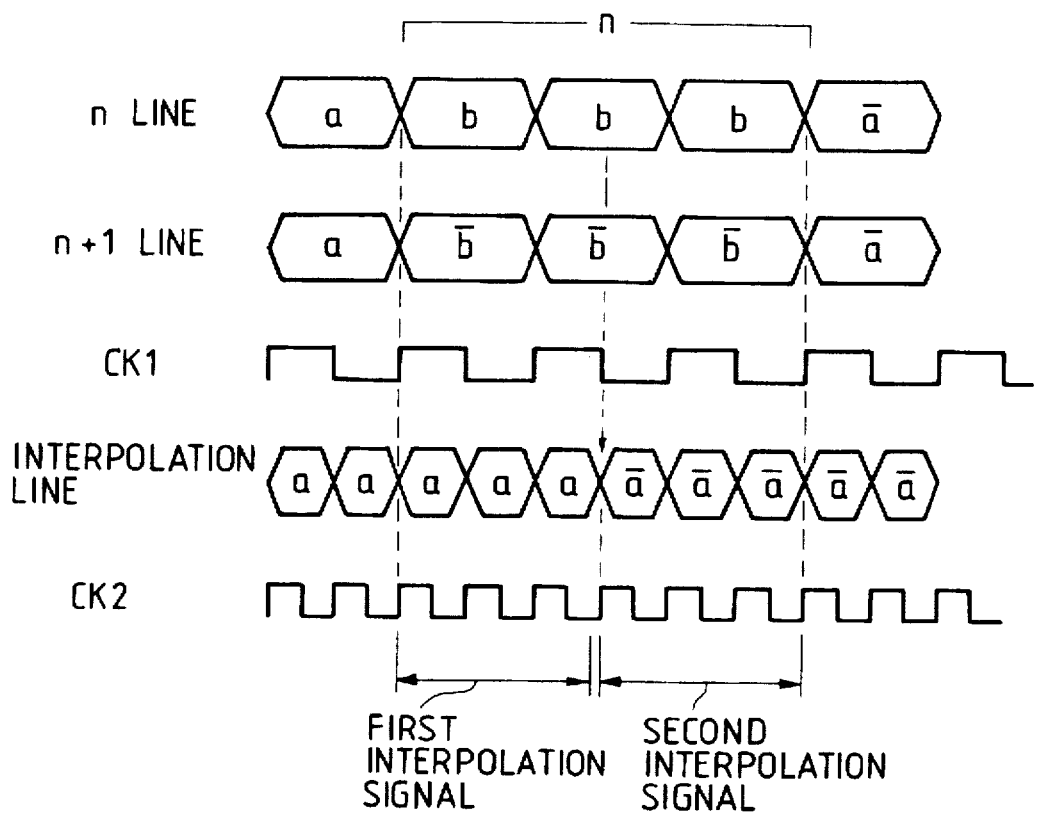
FIG. 3 is a diagram schematically showing the fundamental operation of the invention.

The embodiment relates to the case where the invention was applied to a binary image interpolating circuit. When the foregoing edges having the edge width n were detected from image information of two lines as shown in FIG. 3, the binary image interpolating circuit outputs interpolation signals as many as, for instance, $2m \times (n+2)$ pixels (m is an arbitrary integer) as shown in the diagram. As mentioned above, according to the invention, the oversampling is executed by setting a frequency of the clocks ($CK_2$) on the output side to be $2m$ times as high as a frequency of the clocks ($CK_1$) on the input side in a manner such that the number of pixels of the interpolation signal is equal to $2m \times (n+2)$ for the number of input horizontal pixels of $(n+2)$. By executing the oversampling as mentioned above, the edge of the interpolation line can be located to the center between the position of the edge of the upper line and the position of the edge of the lower line when the edge width n is equal to an odd number.

The above description relates to the case where two lines are referred to. A detecting accuracy of the oblique edge can be raised by referring to three lines.

For instance, a method of detecting an edge by the following patterns will now be considered as an example.

| $c_1$ | | $c_2$ | ← further upper line |
|---|---|---|---|
| $a b_1 b_2$ | $\ldots b_n$ | $\bar{a}$ | ← upper line |
| $a \bar{b}_1 \bar{b}_2$ | $\ldots \bar{b}_n$ | $\bar{a}$ | ← lower line | where, $a=1$ or $0$, $b_1=b_2=\ldots=b_n=1$ or $0$. $c_1$ and $c_2$ are set so as to satisfy either one of the conditions ($c_1=\bar{a}$ and $c_1=b_1$) and ($c_2=a$ and $c_2=b_n$). As an interpolation signal, the same result as that in the case of referring to two lines mentioned above is output.

Since the invention has an object to interpolate and produce a binary image in which the oblique edge is improved, a method of producing an interpolation signal in the oblique edge portion is specified. However, with respect to the production of an interpolation signal in a portion other than the oblique edge portion, either one of the upper and lower lines may be used or the result of the arithmetic operation of AND or OR of the upper and lower lines may be used.

The following three means are needed to construct the binary image interpolating circuit for executing the interpolating operation as mentioned above.

A. Means for detecting an oblique edge by referring to a plurality of lines

B. Means for producing a first interpolating signal (corresponding to (a) in the above description) in the edge width.

C. Means for producing a second interpolation signal (corresponding to ($\bar{a}$) in the above description) in the edge width.

Further, when examining a method of realizing the above means, there are two realizing methods for each of the above means as large classifying methods.

Those realizing methods will now be listed below.

|Oblique edge detecting method|

A1. Partial pattern detection

A2. Whole pattern batch detection

|Method of producing the first interpolation signal a|

B1. The signal a appearing at the head of the oblique edge is continuously held and output.

B2. Since either one of the signals b and $\bar{b}$ appearing in the way of the oblique edge is equal to the signal a, the equal signal is selected and output.

[Method of producing the second interpolation signal $\bar{a}$]

C1. The signal a which was output by the method B1 or B2 is inverted and the inverted signal $\bar{a}$ is output.

C2. Since either one of the signals b and $\bar{b}$ appearing in the way of the oblique edge is equal to the signal $\bar{a}$, the equal signal is selected and output in a manner similar to the case of the method B2.

The binary image interpolating circuit of the invention is constructed by using a combination of the above realizing methods.

Practical embodiments according to the invention will now be described hereinbelow.

Figure 1:
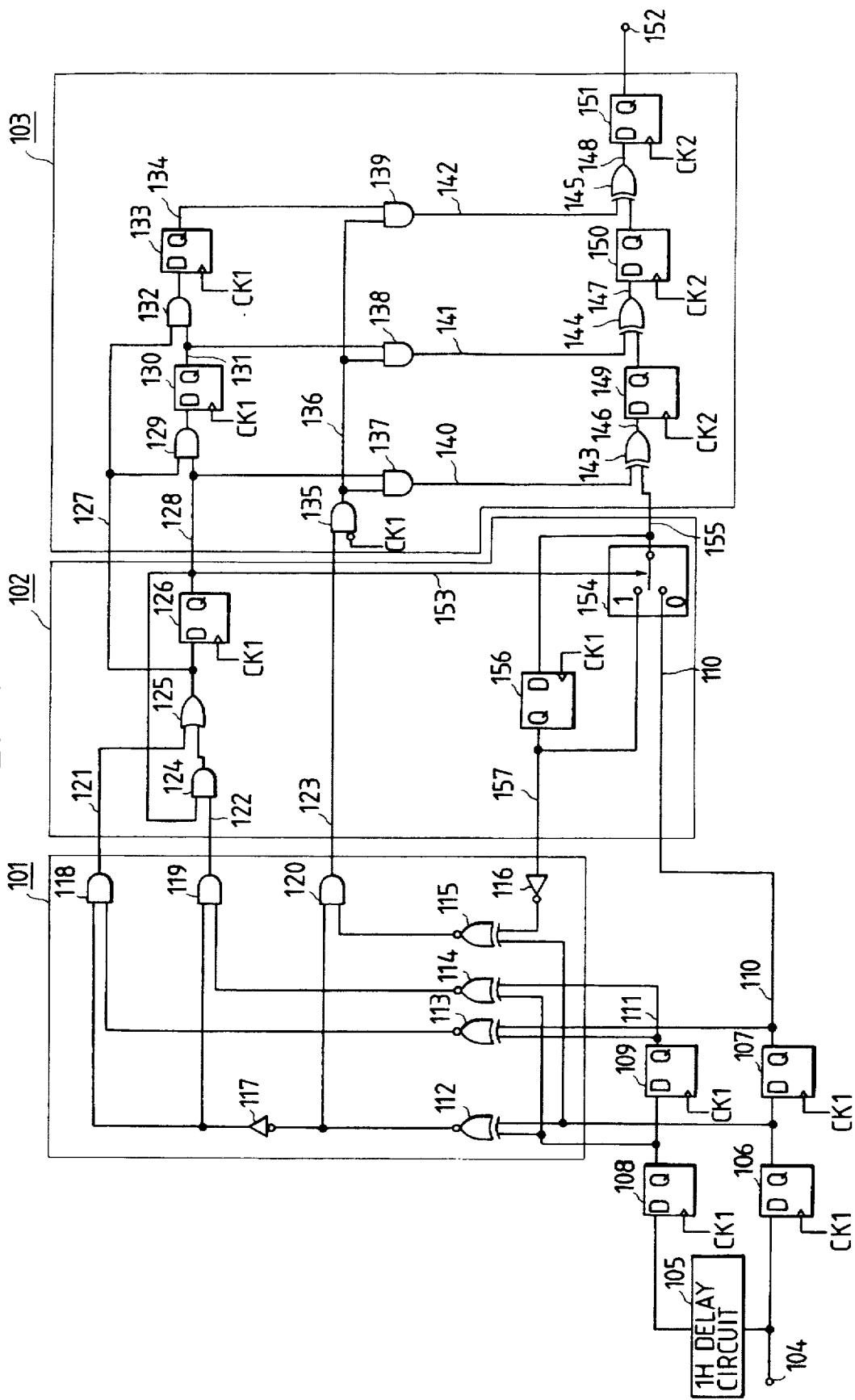
FIG. 1 is a block diagram showing the first embodiment of the invention.

FIG. 1 shows the first embodiment of the invention.

The embodiment relates to an example which is constructed by a combination of three realizing methods A1, B1, and C1.

In the diagram, reference numeral 104 denotes a terminal to input a binary image; 105 indicates a 1H delay circuit for delaying the input binary image by a time corresponding to one horizontal scanning period; and 106 to 108 represent one-bit D flip-flops (hereinafter, abbreviated to D-FF).

Reference numeral 101 denotes a block for detecting an oblique edge from the input binary image by a partial pattern detecting method; 102 is a block for holding the signal a appearing at the head of the oblique edge and continuously outputting the signal a for an edge period of time; 103 is a block for outputting the signal $\bar{a}$ by inverting the signal a which is output from the block 102 for only a necessary period; and 152 is a terminal to output the binary image which was interpolated and produced.

The binary image which was input from the terminal 104 is converted by the 1H delay circuit 105 and the D-FF 106 to 109 in a manner such that two vertical lines and two horizontal pixels can be simultaneously referred to. The converted signals are sent to the block 101.

Figure 4:
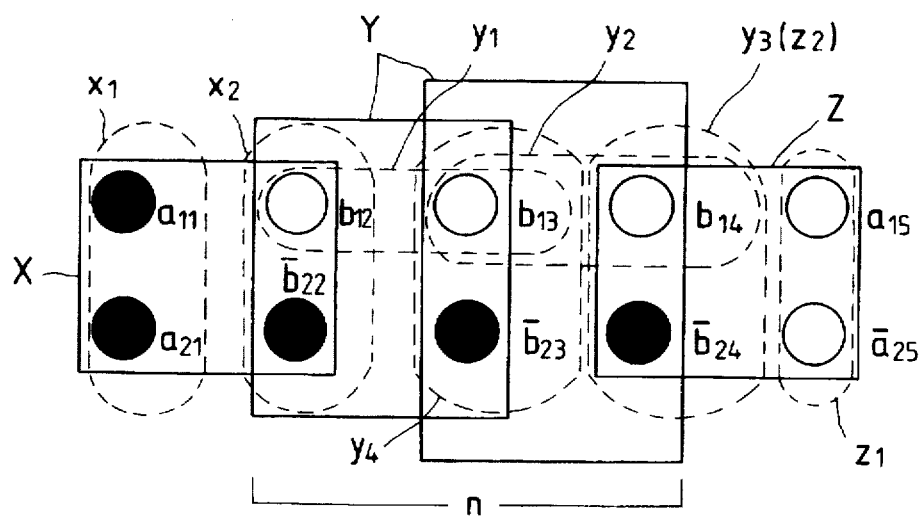
FIG. 4 is a diagram showing the detection of the edge portion according to the invention.

By paying attention to a point that an oblique edge pattern is constructed by three kinds of partial patterns, the block 101 detects the three kinds of partial patterns by AND elements 118 to 120. That is, since the oblique edge pattern is constructed by three partial patterns of a pattern X indicative of the head, a pattern Y indicative of the edge period of time, and a pattern Z indicative of the end as shown in FIG. 4, the patterns X, Y, and Z are detected.

Figure 5:
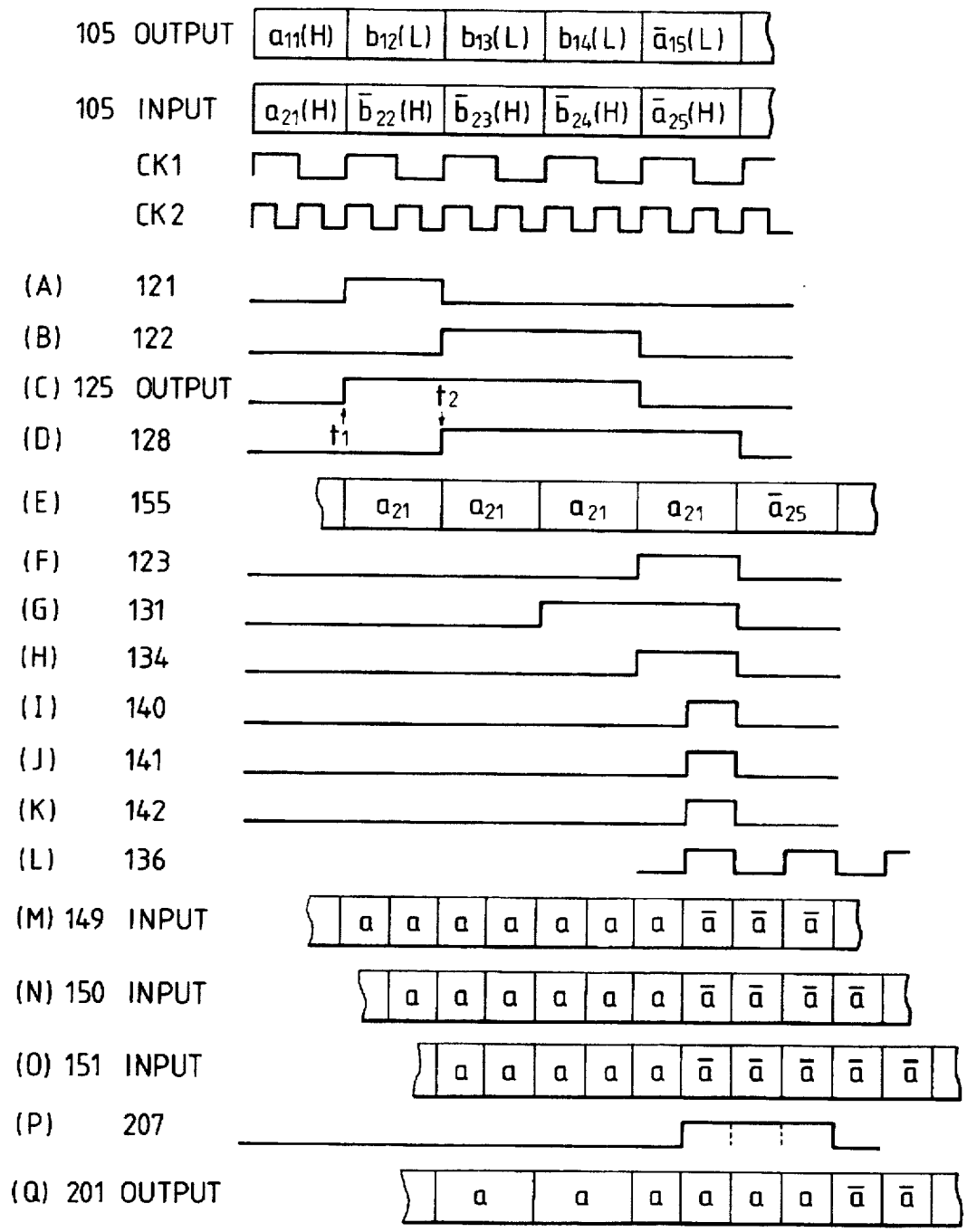
FIG. 5 is a timing chart showing the operation of the embodiment shown in FIG. 1.

The practical detecting operation of the block 101 will now be described hereinbelow with reference to FIGS. 1, 4, and 5.

An EX-NOR 113 detects whether outputs ($a_{21}$ and $a_{11}$) of the D-FF 107 and 109 have the same value or not, that is, whether a pattern $x_1$ in a head pattern X exists or not. On the other hand, at this time, a check is made by an EX-NOR 112 and an NOT 117 to see if outputs ($b_{22}$ and $b_{12}$) of the D-FF 106 and 108 are exclusive or not, namely, whether a pattern $x_2$ in the head pattern X exists or not. If the two patterns $x_1$ and $x_2$ concurrently exist, it can be said that a pattern of 2×2 which is output from the D-FF 106 to 109 is the head pattern X of the oblique edge. Therefore, such a pattern is detected by the AND element 118 and a gate output as shown in FIG. 5(A) is output.

Then, an EX-NOR 114 checks to see if outputs ($b_{13}$ and $b_{12}$, or $b_{14}$ and $b_{13}$, or the like) of the D-FF 108 and 109 have the same value or not, that is, whether a pattern $y_1$ or $y_2$ in an edge period pattern Y exists or not. On the basis of output values of the EX-NOR 112 and the NOT 117, a check is made to see if a pattern $y_3$ in the edge period pattern Y exists or not. When the edge period pattern is detected, a gate output shown in FIG. 5(B) is output. Although the existence of a pattern $y_4$ is also necessary to detect the edge period pattern Y, in this case, the edge period is discriminated by detecting the existence of the above two kinds of patterns, that is, only the pattern comprising $b_{12}$, $b_{13}$, and $\bar{b}_{23}$ or the pattern comprising $b_{13}$, $b_{14}$, and $\bar{b}_{24}$ by the AND element 119.

The reason why it is sufficient to execute such a detection is because in the case where a pattern just before the pattern $y_4$ relates to the head of the edge, the pattern $y_4$ has already been detected by the output of the AND element 118 and an output of an OR element 125 has been set to the high level as shown in FIG. 5(C).

The detection of an end pattern Z will now be described. Although an explanation will be made later, at a time point $t_1$ when the head X of the oblique edge was detected, an output of a D-FF 126 is at the "0" level as shown in FIG. 5(D), so that the value of $a_{21}$ has been held in a D-FF 156. An inverted output of $a_{21}$, that is, an output $\bar{a}$ is derived as an output obtained via a NOT 116 of an output of the D-FF 156 as shown in FIG. 5(E) is derived. An EX-NOR 115 discriminates whether $\bar{a}$ has the same value as that of an output $\bar{a}_{25}$ of the D-FF 106 or not, that is, whether a pattern $\bar{a}_{25}$ (edge end point) for $a_{21}$ exists or not. Then, the EX-NOR 112 checks to see if outputs ($\bar{a}_{25}$ and $a_5$) of the D-FF 106 and 108 have the same value or not.

By detecting the above two conditions by the AND element 120, a final pattern $z_1$ is discriminated and a gate output as shown in FIG. 5(F) is output. In this case as well, only the existence of the pattern $x_1$ is detected. As will be obviously understood from the explanation which will be made hereinlater, the result of the discrimination of the end pattern is effective only in the case where the edge period exists just before the end pattern or where the pattern just before the end pattern is the head pattern. Therefore, even if a pattern $Z_2$ (=$Y_3$) is not detected, it will be known that it is the pattern which should obviously exist.

As mentioned above, the block 101 in the embodiment compares predetermined pixel data of the input image information and detects the patterns X, Y, and Z in the edge portion.

The block 102 will now be described.

The block 102 holds the signal $a_{21}$ in the oblique edge pattern and continuously outputs it for the edge period of time.

In the ordinary operating state without an oblique edge, as shown in FIG. 5(D), the output signal of the D-FF 126 is at the "0" level. A selector 154 which is controlled by such an output signal selects a signal 110 and continuously outputs. In this case, the binary signal which is interpolated and produced has a form which was interpolated by the line locating just under the present line on the frame image.

When the head pattern of the oblique edge is detected from the outputs of the D-FF 106 to 109 at a certain time point $t_1$, a signal 121 is set to the "1" level and an output signal 127 of the OR element 125 is also set to the "1" level. At this time point, since the signal 127 is not latched in the D-FF 126, a control signal 153 to control switching of the selector 154 is still held at the "0" level. The signal 110 (whose content is $a_{21}$) which is output from the D-FF 107 is selected. The signal $a_{21}$ is output from the selector as shown in FIG. 5(E). Then, when the clock $CK_1$ is input, the D-FF 107 outputs the $\bar{b}_{22}$ signal. Also, at a time point $t_2$, since the D-FF 126 for supplying the control signal 153 of the selector 154 latches the signal 127 ("1"), the output 127 is also set to "1". Accordingly, the selector 154 does not select the value of $\bar{b}_{22}$ which is output from the D-FF 107. The value of $a_{21}$ which had been output from the selector 154 one clock before and was latched by the D-FF 156 is selected and the signal $a_{21}$ is subsequently output.

At this time, assuming that the pattern Y indicative of the edge period of time was detected from the outputs of the D-FF 106 to 109, the output signal 127 of the OR element 125 is subsequently set to the "1" level. When the clock $CK_1$ is input, the preceding operating state is held as it is. The signal $a_{21}$ is subsequently output from the selector 154. After that, this state is held so long as the edge period of time continues and the signal $a_{21}$ is continuously output.

When the oblique edge is finished and the end pattern is detected, as shown in FIG. 5(F), only a detection signal 123 is set to "1" and the other signals 121 and 122 are set to "0", so that the output of the OR element 125 is set to "0". When the clock $CK_1$ is input, the output of the D-FF 126, namely, the control signal 153 is reset to "0" and the selector 154 is also returned to a state in which the signal 110 is selected and output. At this time, the signal 110 has a value of $\bar{a}_{25}$ in the edge end pattern Z.

It will be understood from the above description that an output signal 155 of the selector 154 when the oblique edge was detected is aaa . . . aā (n samples).

The block 103 will now be described.

The block 103 inverts the signal a for a predetermined period of time of the output signal 155 into the signal $\bar{a}$, thereby producing the second interpolation signal in which a change point of the binary signal is located at the center of the edge period of time.

To realize the above operation, the oversampling of the binary signal is inevitable. For instance, it is assumed that an oblique edge having an edge width (n) of 1 exists. Although the output signal of the selector 154 for such an edge is aa ā, in the above signal as it is, the change point is located to the right of the center. If the signal a at the center of aaā is inverted into aāā, the change point is located to the left of the center. Therefore, by oversampling the output signal aaā of the selector 154 by the clock $CK_2$ whose frequency is twice as high as that of the clock $CK_1$, the output signal aaā is converted into aaaaāā. By inverting only a just before ā, aaa āāā is obtained. As mentioned above, a target interpolation signal can be produced by the oversampling and the inversion of the signal for a predetermined period of time.

Although the case of n=1 has been described above as an example, in order to produce the second interpolation signal when n=2 and n=3, it will be understood that the number of samples for executing the inverting process (a→ā) to the output (155) of the selector 154 is equalized to the edge width n and the interpolation signal is set to n samples before the final pixels ($b_{14}$, $\bar{b}_{24}$) for the edge period of time by using such final pixels as a reference.

As a method of realizing the above processes, a process for counting edge widths (n) and inverting the samples of the same number as the count value upon detection of the edge end pattern will be considered. Although the block 103 is constructed on the basis of such a process, it has only a hardware which can count at most three edge widths because of a limitation of the paper area.

Practically speaking, the edge widths n are counted by D-FF 126, 130, and 133. In the ordinary operation in the case where no oblique edge exists, an output of each D-FF is 000. When the edge of a width 1 is detected, the output is set to 100. When the edge of a width 2 is detected, the output is set to 110. When the edge of a width 3 or longer is detected, the output is set to 111. FIGS. 5(D), 5(G), and 5(H) indicate the case where the edge width is 3.

AND elements 129 and 132 located just before the D-FF are used to clear the count value of the counter in the case where the edge is finished even during the execution of the process or the like.

As mentioned above, if the edge widths n are counted by the D-FF 126, 130, and 133, their outputs are given to inverting circuits (EX-OR) 143 to 145 through AND circuits 137 to 139 as shown in FIGS. 5(I), 5(J), and 5(K). The pixel data which are sequentially supplied to the EX-OR 143 to 145 with a time difference of one clock as shown in FIGS. 5(M), 5(N), and 5(O) are inverted by only the number of samples which is equal to the count value, so that the second interpolation signal is produced. The second interpolation signal is output from the output terminal 152 subsequent to the pixel signal corresponding to $\bar{a}_{25}$. Further, subsequent to the second interpolation signal, the first interpolation signal and the pixel signal corresponding to $a_{21}$ are output.

The inverting operations are executed in a lump when the final pattern of the oblique edge was detected. Therefore, the gates of the AND circuits 137, 138, and 139 are controlled by a gate output of an AND circuit 135 based on the output 123 of the AND circuit 120 for detecting the edge period of time, thereby determining the inverting position. On the other hand, the interpolation signal has been oversampled and the inverting operation is executed within one period of time of the oversampling signal. For this purpose, the inverted input of the clock $CK_1$ as shown in FIG. 5(L) is input to the AND circuit 135 so as to execute the inverting operation for only the half period of time of the reference clock $CK_1$ and to start the inversion from the final pixel in the edge period of time.

In the embodiment, only at most three edge widths can be counted. However, the count number can be increased one by one each time the following hardware sets are increased one by one.

[Expansion unit: AND 132, D-FF 133, AND 139, EX-OR 145, D-FF 151]

On the other hand, although the output signal of the D-FF 107 has been used as an input signal of the selector 154 in the embodiment, the output signal of the D-FF 109 can be used or the OR or AND of the outputs of the D-FF 107 and 109 can be also used.

In the case of using the OR, the interpolation signal of the portion other than the oblique edge portion is formed so as to widen the region of "1". In the case of using the AND contrarily, it is formed so as to widen the region of "0".

Figure 6:
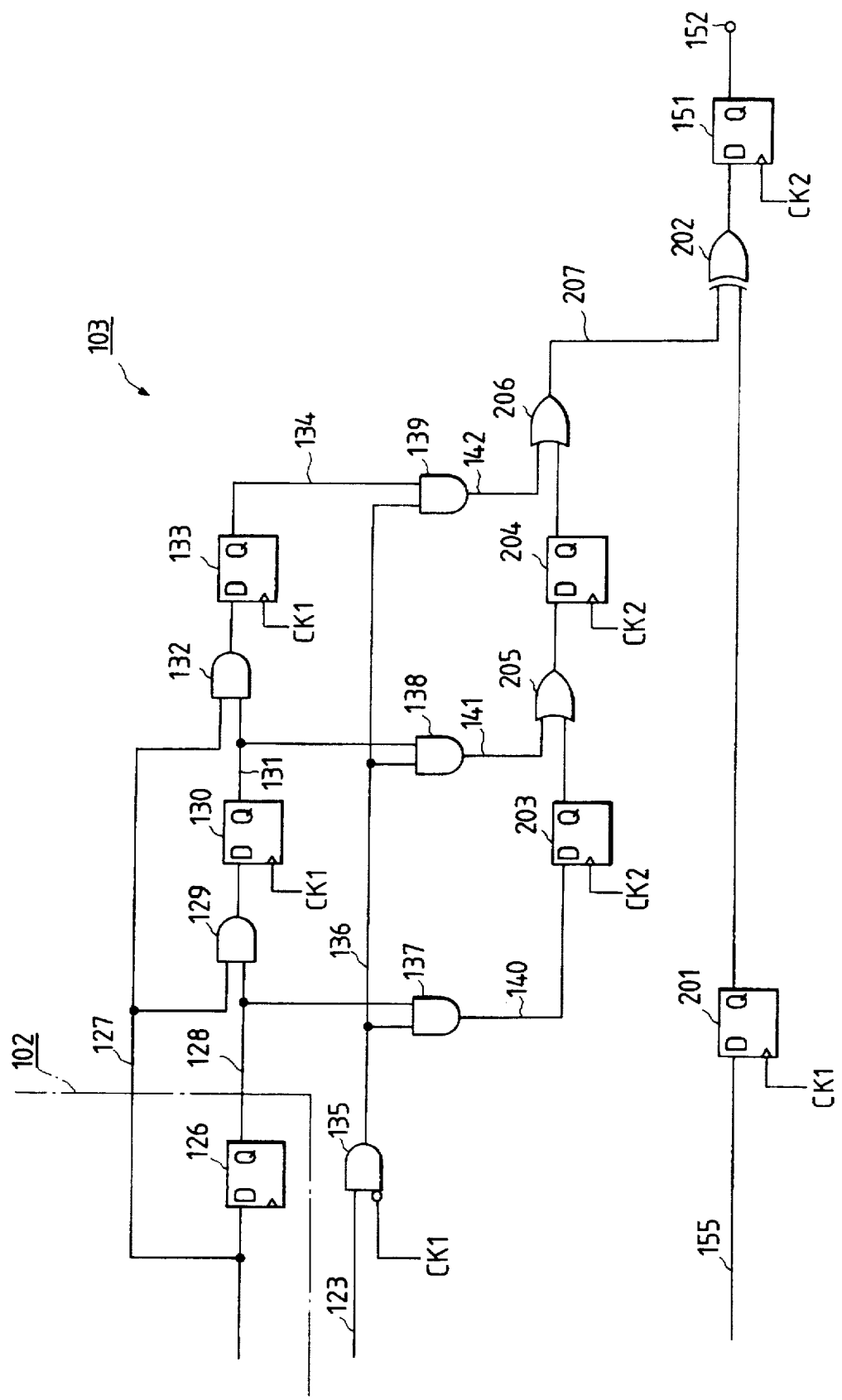
FIG. 6 is a block diagram of a circuit in which a part of the first embodiment is realized by another construction.

The block 103 as mentioned above can also have another construction shown in FIG. 6. Although the construction of FIG. 6 is substantially the same as the block 103 with respect to a point that the signal $\bar{a}$ is formed by inverting the signal a, it differs from the block 103 with respect to a point that only one inverting circuit for inverting the signal a into the signal $\bar{a}$ is used.

The embodiment will now be described in detail hereinbelow with reference to FIGS. 5 and 6.

In FIG. 6, the parts and elements having the same functions as those in the block 103 are designated by the same reference numerals. Therefore, the edge widths (n) are counted by the D-FF 126, 130, and 133 in a manner similar to the block 103. When the end pattern of the oblique edge is detected, the count values are output from the AND circuits 137, 138, and 139 for a period of time when $CK_1$=0. Those signals are synthesized by D-FF 203 and 204 and OR circuits 205 and 206. A signal (207) as shown in FIG. 5(P) to control the inverting operation of an inverting circuit 202 is output. For instance, when the oblique edge of an edge width 1 is detected until the end pattern, only the output of the AND circuit 137 is set to "1". After the output of the AND circuit 137 was delayed by the D-FF 203 and 204 by a time corresponding to two clocks $CK_2$, the inversion control signal 207 is set to "1".

On the other hand, since the inversion control signal 207 has a delay time of two periods of time of the clocks $CK_2$, that is, one period of the clock $CK_1$, the interpolation signal also needs to be delayed by only the same time as such a delay time. For this purpose, a D-FF 201 is provided to thereby delay the first interpolation signal which is output from the block 102 by the time of one period of the clock $CK_1$ as shown in FIG. 5(Q).

The delay signal is inverted by the inverting circuit 202 for only a period of time corresponding to the edge width and is latched by a D-FF 151 at the next stage and, thereafter, it is output to the terminal 152.

Therefore, even in the embodiment, the pixel data corresponding to $a_{25}$ and the pixel data corresponding to the second and first interpolation signals and $a_{21}$ are sequentially output from the output terminal 152. The boundary between the first and second interpolation signals is located at the center of the edge period of time.

Although the above embodiment has been described with respect to the case of an edge width 3, the above effect can be also obtained even in the case of an edge width 2. It has been also confirmed from the experiments that even in the case of an edge width of 4 or more, since only the portions of three pixels on the final side of the edge portion are inverted, a fairly large correcting effect can be obtained.

[Another embodiment]

Figure 7:
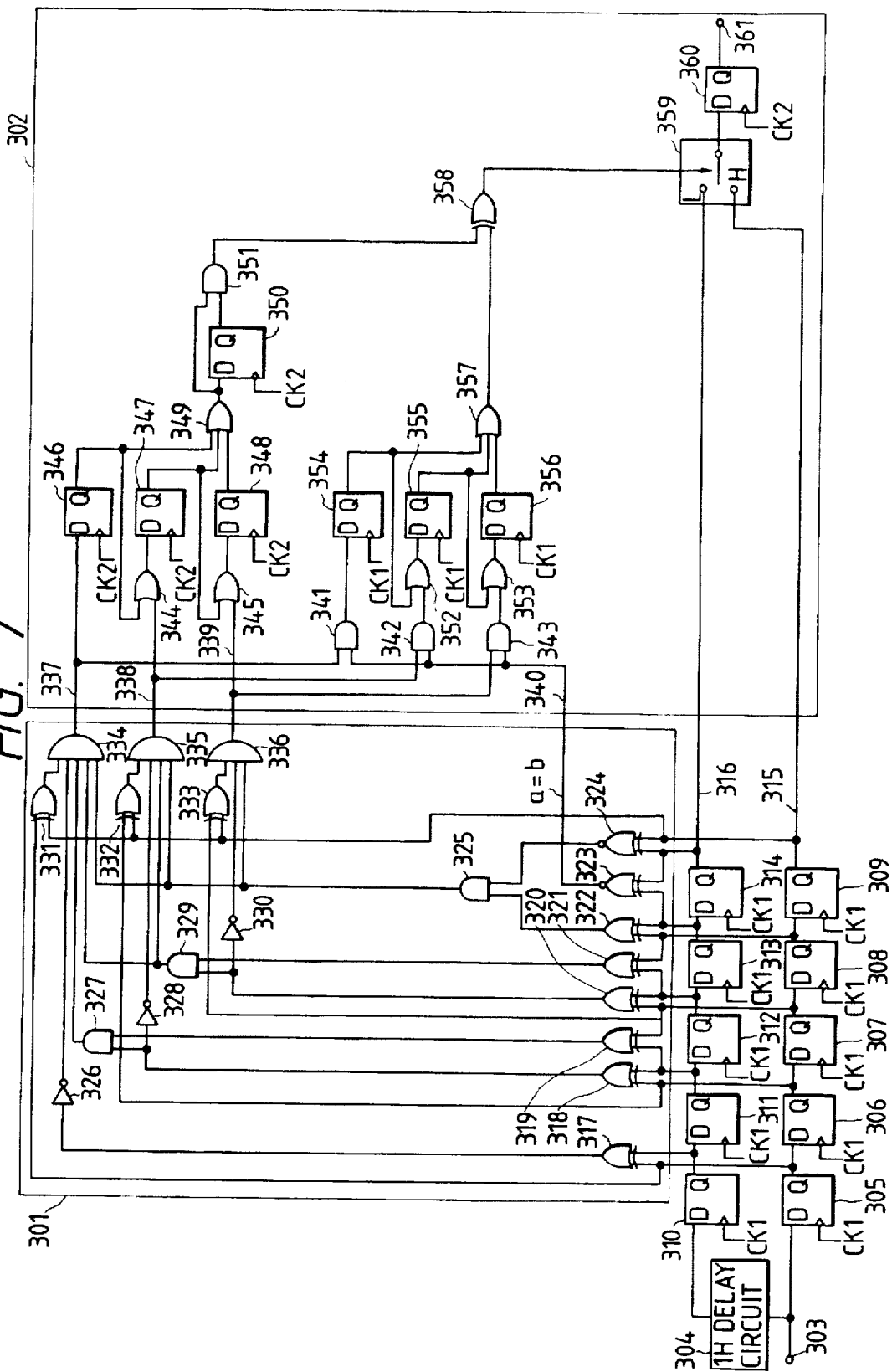
FIG. 7 is a block diagram showing the second embodiment of the invention.

The second embodiment of the invention is shown in FIG. 7.

The processing contents of the embodiment are almost similar to those in the first embodiment. When an oblique edge is detected, the interpolation signals of 2×(n+2) pixels (since the oversampling of two times is executed, the number of pixels is doubled) are output as the interpolation signals.

However, means for realizing the above process differs. When classifying by the foregoing processing methods, the second embodiment comprises a combination of A2, B2, and C2. That is, the detection of the oblique edge is executed in a lump with respect to a whole pattern and for production of the interpolation signals (a, $\bar{a}$), the signals which are equal to a and $\bar{a}$ are selected from b and $\bar{b}$ and output. FIG. 7 will now be described hereinbelow.

In the diagram, reference numeral 301 denotes a detection block for detecting oblique edges in a lump; 302 indicates an interpolation block for producing an interpolation signal; 303 is an input terminal to input a binary image; 304 is a 1H delay circuit for delaying the input binary image by a time corresponding to one horizontal scanning period; 334, 335, and 336 are AND circuits for detecting oblique edges having edge widths 3, 2, and 1, respectively; 359 is a selector for selecting the interpolation signals $\bar{a}$ and a and outputting; 360 is a D-FF for latching the oversampling signal which was interpolated and formed; and 361 is a terminal to output the interpolation signal.

The binary image which was input from the input terminal 303 is converted by the 1H delay circuit 304 and D-FF 305 to 314 so that two vertical lines and five horizontal pixels can be simultaneously referred to. Those signals are sent to the oblique edge detecting block 301.

In the block 301, an edge pattern of an edge width 3 is detected by the AND circuit 334, an edge pattern of an edge width 2 is detected by the AND circuit 335, and an edge pattern of an edge width 1 is detected by the AND circuit 336.

As already described in the first embodiment, the oblique edge pattern is constructed by three kinds (head, edge period, end) of partial patterns.

Therefore, even in this embodiment as well, the above three patterns are detected, thereby detecting an edge pattern. When the head pattern X (refer to FIG. 4) appears in outputs of the D-FF 308, 309, 313, and 314, a "1" signal is output from an EX-NOR circuit 324 for detecting $x_1$ and from an EX-OR circuit 322 for detecting $x_2$, respectively. Thus, a "1" signal is also output from an AND circuit 325. All of the results of the head pattern detection are supplied to the AND circuits 334, 335, and 336 each for detecting the edge pattern.

Since the AND circuit 336 for detecting an edge pattern of a width 1 detects an end pattern $z_1$ in addition to the head pattern, it refers to outputs of EX-OR circuits 320 and 333 and a NOT circuit 330.

Among the above logic circuits, the EX-OR circuit 320 and the NOT circuit 330 detect that the outputs of the D-FF 312 and 307 are equal. The EX-OR circuit 333 detects that the outputs of the D-FF 312 and 307 are different from a, that is, they are equal to $\bar{a}$.

Similarly, in the AND circuit 335 for detecting an edge pattern of an edge width 2, in addition to the head pattern, an edge period pattern Y is detected from EX-OR circuits 320 and 321 and an AND circuit 329 and an end pattern $z_1$ is detected from EX-OR circuits 318 and 332 and a NOT circuit 328.

As mentioned above, the oblique edges of widths 1 to 3 are detected and detection signals 337, 338, and 339 are sent to the interpolation block 302. On the other hand, in the detected oblique edge patterns, an EX-NOR circuit 323 detects whether b is equal to a or not and also sends the result of the detection to the interpolation block 302.

In the interpolation block 302, a switching control signal of the selector 359 is generated from the detection signals 337, 338, 339, and 340, a desired interpolation signal is produced and latched into the D-FF 360, and thereafter, it is output to the output terminal 361.

The selector 359 selects either one of the information of two vertical lines which are output from the D-FF 309 and 314 and outputs the selected one. In the ordinary region in which no oblique edge is detected, the control signal of the selector is set to "0". In this case, the output of the D-FF 314 is selected and output from the selector.

When the oblique edge is detected, with respect to the head signal a and the final signal $\bar{a}$, since the outputs are the same even if any one of the two lines is selected, the control signal can be set to any one of the "0" and "1" levels. However, in the embodiment, the control signal is set to "0" by considering the matching with the ordinary operation. A D-FF 350 and an AND circuit 351 are provided for this purpose. However, there is no problem in operation even if they are not used.

Eventually, the control signal of the selector 359 is set to "1" only for the edge period of time of the oblique edge. When b is equal to a, the control signal is set to "1" for the latter half period of time. When b is not equal to a, that is, when $\bar{b}=a$, the control signal is set to "1" for only the former half period. Thus, the signal a is output from the selector 359 for the former half period in the edge period of time. The signal $\bar{a}$ is output from the selector 359 for the latter half period.

The above operation will now be described in detail hereinbelow with reference to FIG. 8.

When the edge detecting block 301 detects the oblique edge pattern, either one of the signals 337, 338, and 339 is set to "1" in correspondence to the edge width. FIG. 8 shows the case where the edge width is equal to 3. As shown in (A) in FIG. 8, the signal 337 is set to "1".

The signal 337 is set to "1" for the period of one reference clock $CK_1$. The signal 337 is set to "1" for the period of two clocks $CK_2$ whose frequency is twice as long as the frequency of the clock $CK_1$.

Figure 8:
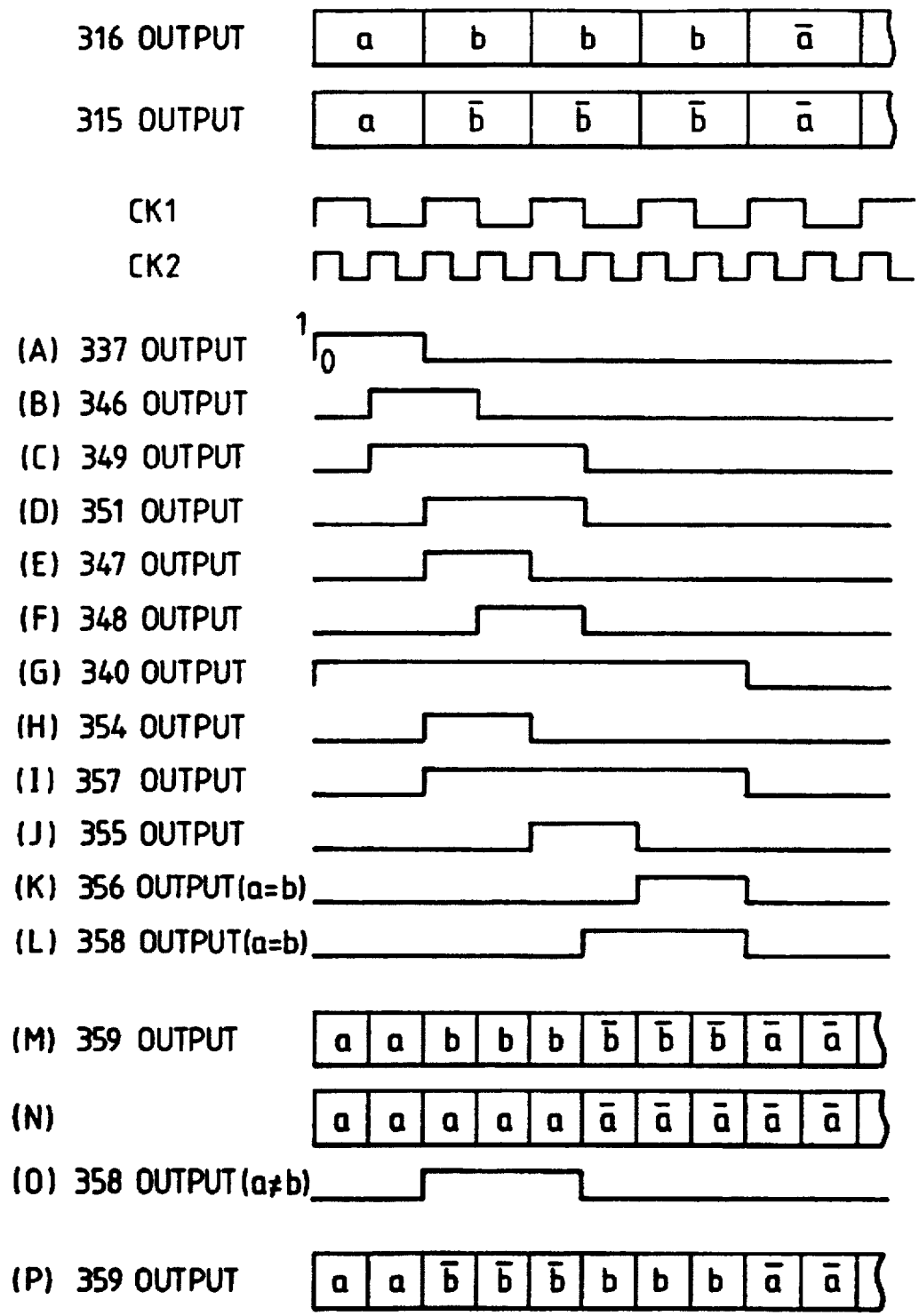
FIG. 8 is a timing chart showing the operation of the second embodiment.

The signal 337 is latched twice into a D-FF 346, so that it is delayed by a period corresponding to one clock $CK_2$ as shown in (B) in FIG. 8 and sent to an OR circuit 349. Due to this, after the half period of time (for the reference clock) in which the edge pattern was detected, an output of the OR circuit 349 is set to "1" as shown in (C) in FIG. 8. The signal is further delayed by the half period by the delay operation of the D-FF 350 and an output of the AND circuit 351 is set to "1" as shown in (D) in FIG. 8. At this time, the input signals to the selector 359 are also changed from $a_{11}$ and $a_{21}$ to $b_{12}$ and $\overline{b}_{22}$.

On the other hand, the signal "1" which was latched in the D-FF 346 is delayed by OR circuits 344 and 345 and D-FF (347, 348) as shown in (E) and (F) in FIG. 8 and is input to the OR circuit 349. Therefore, the outputting period of the signal "1" of the OR circuit is extended as shown in (C) in FIG. 8. After the period of one clock $CK_1$ at which the level of the output of the D-FF 346 was changed from "1" to "0", the output level of the OR circuit changes from "1" to "0". At the same time, the output level of the AND circuit 351 also changes from "1" to "0".

As mentioned above, it will be understood that the outputting period of the "1" signal of the AND circuit 351 coincides with the former half period in the edge period of time as shown in (D) in FIG. 8.

On the other hand, when a and b of the detected edge are equal, since the signal 340 is set to "1" as shown in (G) in FIG. 8, the output of an AND circuit 341 coincides with the signal 337 and the "1" signal is also transferred here. The signal is delayed by a D-FF 354 by a time of one clock $CK_1$ as shown in (H) in FIG. 8. After that, the delayed signal is latched and sent to an OR circuit 357. Due to this, when a=b, after completion of one period of time in which the edge pattern was detected, an output of the OR circuit 357 is set to "1" as shown in (I) in FIG. 8. On the other hand, the "1" signal which was latched in the D-FF 354 is delayed by OR circuits 352 and 353 and D-FF 355 and 356 as shown in (J) and (K) in FIG. 8. The delayed signal is input to the OR circuit 357. Therefore, the outputting period of the "1" signal of the OR circuit is extended. After completion of two periods at which the output level of the D-FF 354 was changed from "1" to "0", the output level of the OR circuit 357 is changed from "1" to "0". Therefore, it will be understood that the outputting period of the "1" signal of the OR circuit 357 coincides with the edge period as shown in (I) in FIG. 8. A control signal of the selector 359 is derived by synthesizing the outputs of the AND circuit 351 and the OR circuit 357 by an EX-OR circuit 358.

Since those outputs are at the "0" level for a period of time other than the edge period, an output of the EX-OR circuit 358 is also set to "0".

For the edge period, the above EX-OR output differs depending on whether b=a or not. That is, when b=a, since the output of the OR circuit 357 is set to "1", as shown in (L) in FIG. 8, an inverted signal of the output of the AND circuit 351 is output from the EX-OR circuit 358, so that an output as shown in (M) in FIG. 8 is obtained. Since a=b in this case, the output shown in (M) in FIG. 8 has the same value as that shown in (N) in FIG. 8. On the other hand, when b=$\overline{a}$, since the output of the OR circuit 357 is at the "0" level, the output of the AND circuit 351 is directly output from the EX-OR circuit 358 as shown in (O) in FIG. 8.

Therefore, the selector 359 outputs the signal in which only the former half portion of the edge period was inverted (b→$\overline{b}$=a) as shown in (P) in FIG. 8. Since a=$\overline{b}$, this output has the same value as that shown in (N) in FIG. 8.

It will be understood from the above description that the target control signal was accurately formed.

Although the embodiment has been realized by a combination of the three processing methods A2, B2, and C2 as already mentioned above, such a combination can be changed to a combination of A2, B1, and C1 by an extremely small change.

Such an example will now be described hereinbelow with reference to FIGS. 9 and 10.

Figure 9:
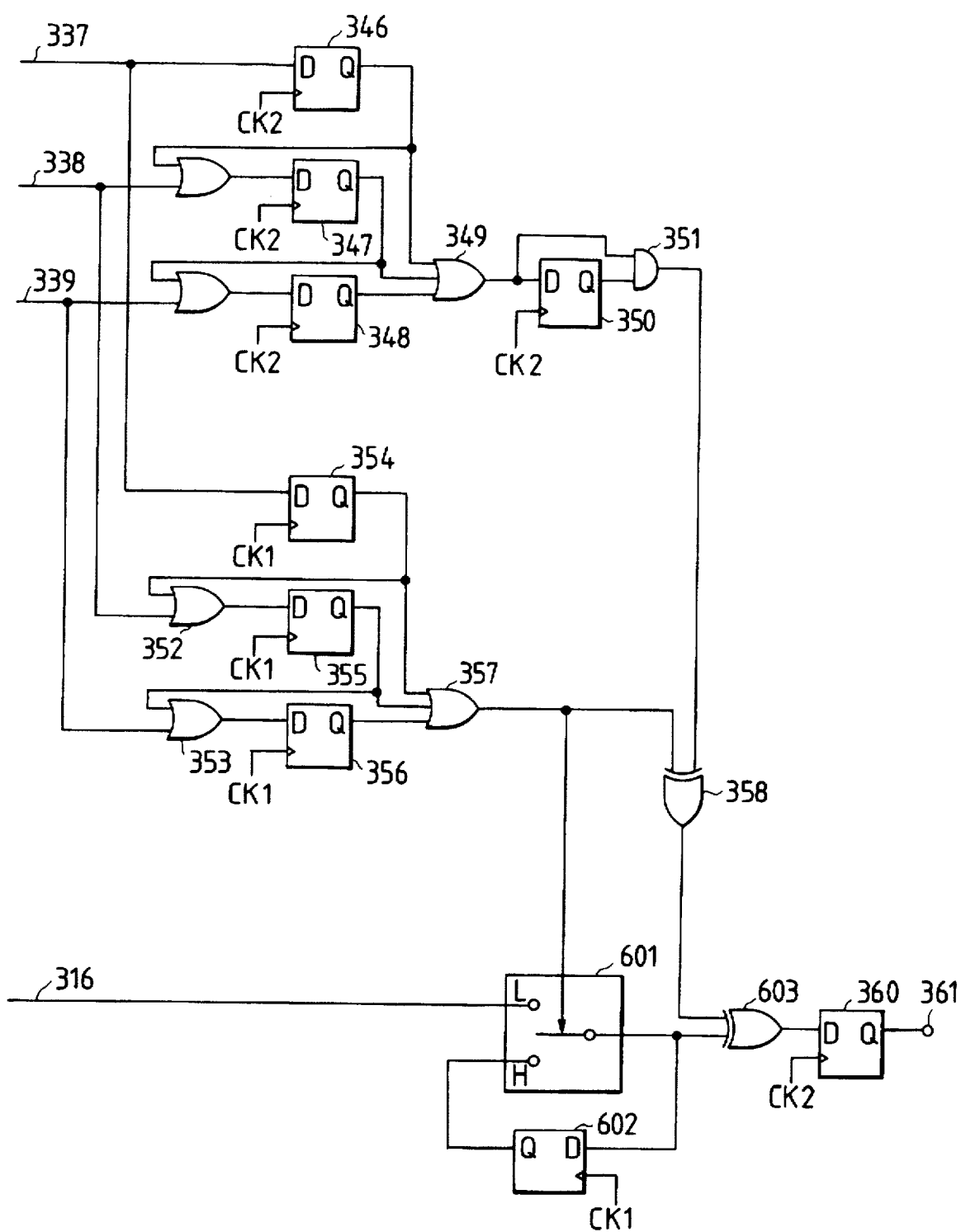
FIG. 9 is a block diagram of a circuit in which a part of the second embodiment is realized by another construction.

In this case, it is sufficient to change the interpolation block 302 in FIG. 7 to a circuit shown in FIG. 9.

In FIG. 9, the circuits, elements, and signals having substantially the same functions as those in FIG. 7 are designated by the same reference numerals.

As shown in the first embodiment, according to the B1 and C1 processing methods, the signal a is continuously output for the edge period and there is no need to detect whether b=a or not. Therefore, in the embodiment of FIG. 9, such a detecting circuit is not used.

That is, in this embodiment, a holding circuit for continuously outputting the value of signal a is constructed by a selector 601 and a D-FF 602 and the output of the OR circuit 357 is used as a holding control signal. Due to this, the signal for the edge period is replaced with a. Then, the output of the EX-OR circuit 358 is used as a signal to invert the signal a. Therefore, the signal a is converted into the signal $\overline{a}$ for the latter half period of the edge period.

Figure 10:
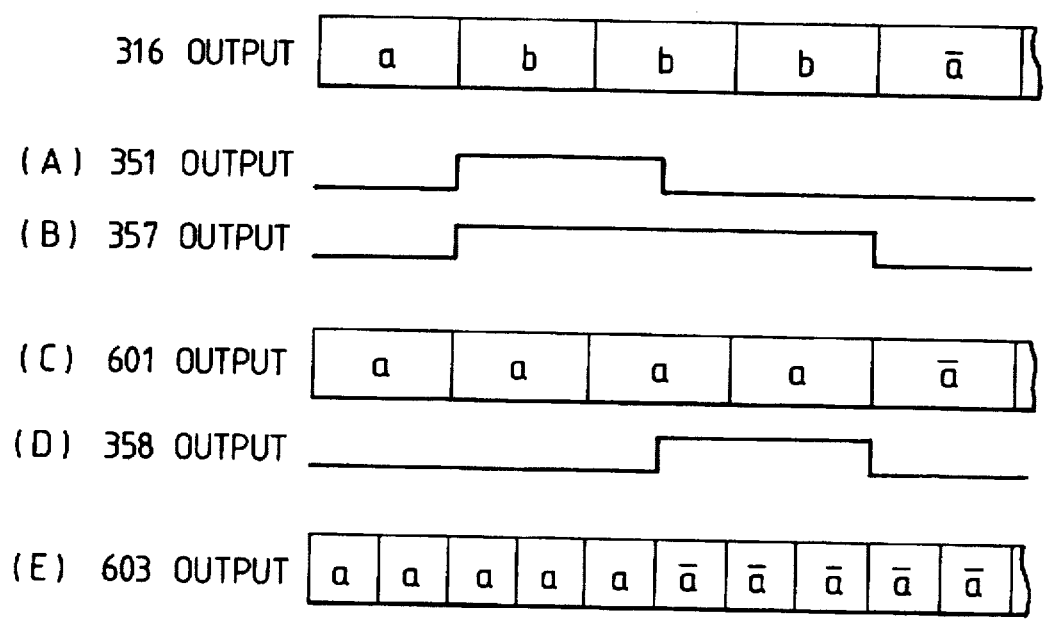
FIG. 10 is a timing chart showing the operation of the embodiment shown in FIG. 9.
Figure 11:
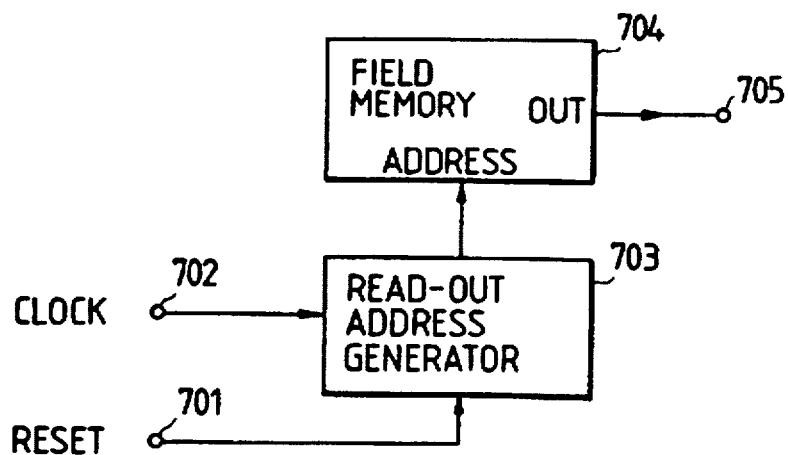
FIG. 11 is a block diagram for outputting a conventional field image.
Figure 12:
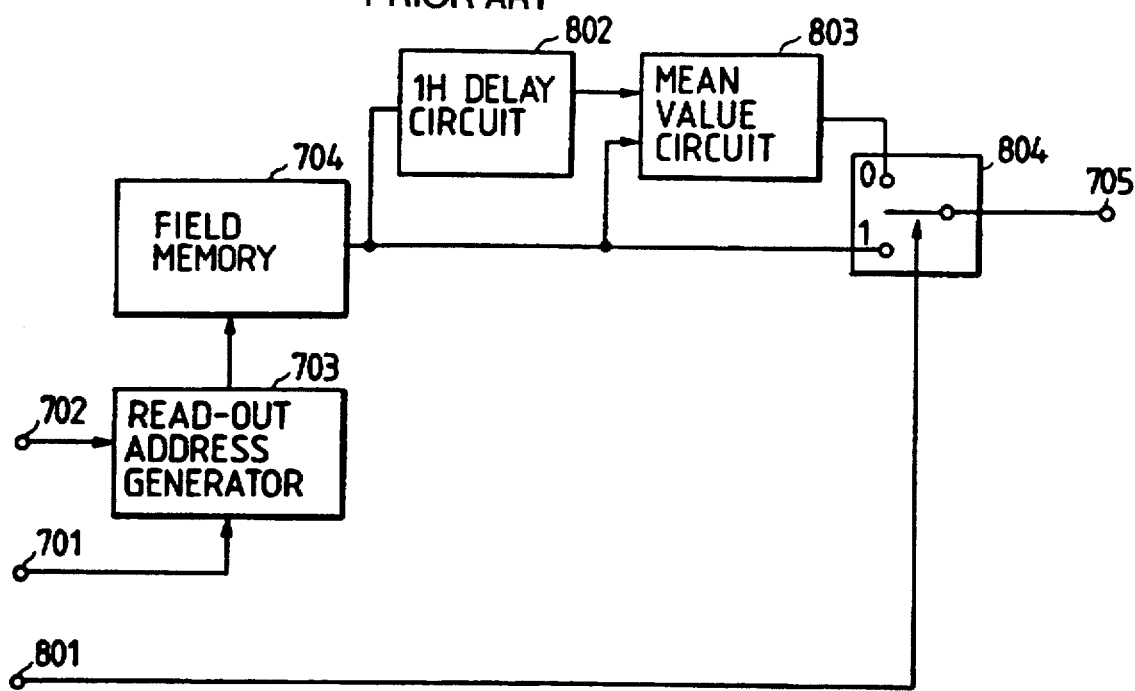
FIG. 12 is a block diagram for producing a frame image from the conventional field image.

That is, in the embodiment, at a time point when the edge period was detected, the outputs of the AND circuit 351 and the OR circuit 357 are set to "1" as shown in (A) and (B) in FIG. 10. The selector 601 is switched from "0" to "1" by the output of the OR circuit 357. Thus, the output of the selector 601 is set to the value before switching, that is, the signal "a" which was latched in the D-FF 602. This value is held for a period of time (edge period) when the output of the OR circuit 357 is switched from "1" to "0" as shown in (C) in FIG. 10.

On the other hand, the inverted output by the EX-OR circuit 358 of the outputs of the AND circuit 351 and the OR circuit 357 is set to "1" for the latter half period of the edge period as shown in (D) in FIG. 10. The "1" signal is input as a control signal to an EX-OR circuit 603. The output of the selector 601 is inverted by the EX-OR circuit 603 for the latter half period as shown in (E) in FIG. 10.

The inverted output by the EX-OR circuit 603 is timing-controlled by the D-FF 360 and is output through the output terminal 361.

As mentioned above, even in the embodiment, the interpolation signal in which the edge portion is switched at the center of the edge period can be obtained in a manner similar to the foregoing embodiment.

On the other hand, in each of the above embodiments, the edge detection and the production of the interpolation signals can be executed by the block which is constructed by various gate circuits. Therefore, it is sufficient to use only the 1H delay circuit as a memory circuit, the costs can be reduced, and a memory drive circuit for the memory circuit is unnecessary, so that a circuit construction is also simplified.

From an image having only the information of one field, an image of another field can be interpolated and produced by use of the invention, so that a frame image in which the oblique edges were improved can be obtained.

In particular, for the interpolation signal, since the number of pixels is increased by 2 m times by oversampling the pixel information of the second scanning line, a smooth oblique edge pattern can be obtained irrespective of the edge width.

We claim:

1. An image interpolating circuit for producing pixel information of an interpolation line to be inserted between first and second scanning lines by using pixel information of the first and second scanning lines which are adjacent to each other, comprising:
    detection means for detecting an oblique edge pattern by using pixel information formed from said oblique edge pattern of the first and second scanning lines; and
    interpolation signal producing means for setting a number of pixels of said interpolation line to be inserted between said first and second scanning lines to be 2 m times (where m is an integer) as large as the number of pixels of each of the first and second scanning lines and inserting said interpolation line by locating the position of the edge of said interpolation line at a central position between the position of the edge of the first scanning line and the position of the edge of the second scanning line according to the oblique edge pattern detected by said detection means.

2. A circuit according to claim 1, wherein the detecting means has a first detecting circuit for detecting a head pattern of the oblique edge pattern, a second detecting circuit for detecting an edge width, and a third detecting circuit for detecting a final pattern.

3. A circuit according to claim 2, wherein each of the first to third detecting circuits detects each of the above patterns and the edge width by comparing predetermined pixel information in the pixel information in the first and second scanning lines with each other.

4. A circuit according to claim 2, wherein each of the first to third detecting circuits has a plurality of holding circuits each for holding a plurality of pixel information in the first scanning line and a plurality of pixel information in the second scanning line corresponding to said plurality of pixel information in the first line, and a plurality of gate circuits each for comparing output values of the holding circuits with each other on the basis of a predetermined combination.

5. A circuit according to claim 4, wherein said plurality of pixel information in each of the scanning lines includes the pixel information of two adjacent pixels.

6. A circuit according to claim 1, wherein the interpolation signal producing means includes a first producing circuit for producing a first interpolation signal in an edge width of the oblique edge pattern and a second producing circuit for producing a second interpolation signal by inverting the first interpolation signal at half of the edge width.

7. A circuit according to claim 6, wherein the second producing circuit has a detecting circuit for detecting the number of pixels corresponding to the edge width and an inverting circuit for inverting the value of an input signal corresponding to the first interpolation signal in accordance with the number of pixels detected.

8. A circuit according to claim 7, wherein the input signal includes the signal which is obtained by sampling the first interpolation signal by a double frequency.

9. A circuit according to claim 7, wherein the detecting circuit includes a counter.

10. A circuit according to claim 6, wherein the second producing circuits comprises a plurality of connected units circuits each comprising:
    a circuit for designating half the edge width; and
    an inverting circuit for, in response to an output of said circuit, inverting an input signal corresponding to said pixel of the first interpolation signal.

11. A circuit according to claim 10, wherein the number of unit circuits is equal to the number of pixels of the edge width which can be detected.

12. A circuit according to claim 1, wherein the pixel information comprises binary information.

13. A circuit according to claim 1, wherein the number of pixels of the interpolation scanning line is 2 m times (m is an arbitrary integer) as large as the number of pixels of each of the first and second scanning lines.

14. An image interpolation circuit comprising:
    (a) first holding means for holding predetermined pixel information of a first scanning line;
    (b) second holding means for holding predetermined pixel information of a second scanning line;
    (c) detection means for detecting an oblique edge pattern on the basis of the pixel information from each of the first and second holding means; and
    (d) interpolation signal producing means for producing interpolation signals according to the detected oblique edge pattern, wherein the number of pixels of the interpolation line is 2 m times (m is an integer) as large as the number of pixels of the first scanning line and the position of the edge of the interpolation line is located at a central position between the position of the edge of the first scanning line and the position of the edge of the second scanning line according to the oblique edge pattern detected by said detection means.

15. A circuit according to claim 14, wherein the pixel information comprises binary information.

16. A circuit according to claim 14, wherein each of the first and second holding means includes at least two latch circuits.

17. A circuit according to claim 14, wherein the interpolation signal producing circuit detects a head pattern, an edge width, and a final pattern of the oblique edge pattern and produces an interpolation signal corresponding to those patterns.

18. A circuit according to claim 14, wherein the number of interpolation pixels of the interpolation signal is larger than the number of pixels in each of the first and second scanning lines.

19. A circuit according to claim 18, wherein the number of the interpolation pixels is 2 m times (m is an arbitrary integer) as large as the number of the pixels in each of the first and second scanning lines.

20. A circuit according to claim 14, wherein each of the first and second holding means includes a plurality of latch circuits of the number of which is more than the number of pixels corresponding to an edge width of an oblique edge pattern which can be detected.

21. A circuit according to claim 20, wherein a head pattern, an edge width, and a final pattern of the oblique edge pattern are detected by a single detecting operation by using the pixel information from the first and second holding means.

22. An image interpolation device comprising:
    (a) input means for inputting image information of one field;
    (b) detection means for detecting an oblique edge pattern by using pixel information formed from first and second scanning lines; and
    (c) processing means for outputting information of an interpolation line to be located between the first and second scanning lines by using information of the first and second scanning lines in the image information which was input by the input means to provide image information of another one field interlaced with said image information of one field input by said input means.

wherein the number of pixels of the interpolation line is 2 m times (m is an integer) as large as the number of pixels of the first scanning line and the position of the edge of the interpolation line is located at a central position between the position of the edge of the first scanning line and the position of the edge of the second scanning line according to the oblique edge pattern detected by said detection means.

23. A device according to claim 22, wherein the image information comprises binary information and the processing means is constructed so that an inverting position of the binary information of an interpolation line is located at the center between an inverting position of a binary information of the first scanning line and a binary information inverting position of the second scanning line.

24. A binary signal interpolation apparatus, comprising:
(a) input means for receiving binary signal information comprising a plurality of scanning lines; and
(b) processing means for generating information of an interpolation scanning line to be placed between the nth scanning line and the (n+1)th scanning line of said binary signal information by using information of said nth scanning line and said (n+1)th scanning line, said information of said interpolation scanning line comprising an array, in the scanning direction, of data of pixels whose number is 2 m times (where m is an integer greater than one) as large as a number of pixels of said nth scanning line, a position where inversion of said information of said interpolation scanning line occurs being located at a central position of a position where inversion of the information of said nth scanning line occurs and a position where inversion of the information of said (n+1)th scanning line occurs.

25. A two-valued signal interpolation apparatus according to claim 24, wherein interpolation two-valued signal information comprising a plurality of interpolation scanning lines constructs one picture which is interlaced with said two-valued signal information.

26. A two-valued signal interpolation apparatus according to claim 25, wherein said two-valued signal information includes two-valued image information.

27. An image processing apparatus for producing an image signal of an interpolation line to be located between first and second scanning lines of an image signal by using the image signals of the first and second scanning lines which are adjacent each other, comprising:
input means for inputting an image signal comprising a plurality of pixels each of which has a first level and a second level;
detection means for detecting an oblique edge pattern on the basis of the pixels of the first scanning line and the second scanning line of the image signal input by said input means; and
interpolation signal producing means for setting a number of pixels of said interpolation line to be inserted between said first and second scanning lines to be 2 m (where m is an integer) times as large as the number of pixels of each of the first and second scanning lines and inserting said interpolation line by locating a position at which a pixel level of the interpolation line changes from a first level to second level, at a central position between the position of the edge of the first scanning line and the position of the edge of the second scanning line according to the oblique edge pattern detected by said detection means.

\* \* \* \* \*

UNITED STATES PATENT AND TRADEMARK OFFICE
CERTIFICATE OF CORRECTION

PATENT NO. : 5,796,878
DATED : August 18, 1998
INVENTOR(S) : TADAYOSHI NAKAYAMA, ET AL.

Page 1 of 2

It is certified that error appears in the above-identified patent and that said Letters Patent is hereby corrected as shown below:

COLUMN 1:

Line 13, "interlace scanned" should read --interlacle-scanned--.

COLUMN 4:

Line 47, "lines" should read --lines.--;
    Line 59, "detection" should read --detection.--; and
    Line 60, "detection" should read --detection.--.

COLUMN 6:

Line 22, "$a_5$)" should read --$a_{15}$)--.

COLUMN 7:

Line 30, "aa" should read --aa$\bar{a}$,--;
    Line 31, "$\bar{a}$," should be deleted;
    Line 37, "aaa" should read --aaaaaa--; and
    Line 38, "aaa" should be deleted.

COLUMN 13:

Line 59, "circuits" should read --circuit--.

UNITED STATES PATENT AND TRADEMARK OFFICE
CERTIFICATE OF CORRECTION

PATENT NO. : 5,796,878
DATED : August 18, 1998
INVENTOR(S) : TADAYOSHI NAKAYAMA, ET AL.

It is certified that error appears in the above-identified patent and that said Letters Patent is hereby corrected as shown below:

COLUMN 16:

Line 2, "interpolation two-valued signal" should read --two-valued signal interpoation--.

Signed and Sealed this

Thirtieth Day of March, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,796,878
DATED : August 18, 1998
INVENTOR(S) : TADAYOSHI NAKAYAMA, ET AL.

It is certified that error appears in the above-identified patent and that said Letters Patent is hereby corrected as shown below:

COLUMN 14,
Lines 3-6, delete Claim 13 in its entirety; and
Lines 35-42, delete Claims 18 and 19 in their entirety.

COLUMN 16,
Lines 1-8, delete Claims 25 and 26 in their entirety.

Signed and Sealed this

First Day of June, 1999

Attest:

Attesting Officer

Q. TODD DICKINSON

Acting Commissioner of Patents and Trademarks